United States Patent
Atkinson

(10) Patent No.: US 10,260,667 B2
(45) Date of Patent: Apr. 16, 2019

(54) TAMPER-RESISTANT FRICTIONLESS CONNECTOR ASSEMBLY

(71) Applicant: Karl M. Atkinson, Salem, MA (US)

(72) Inventor: Karl M. Atkinson, Salem, MA (US)

( * ) Notice: Subject to any disclaimer, the term of this patent is extended or adjusted under 35 U.S.C. 154(b) by 221 days.

(21) Appl. No.: 15/412,781

(22) Filed: Jan. 23, 2017

(65) Prior Publication Data

US 2017/0211730 A1   Jul. 27, 2017

Related U.S. Application Data

(60) Provisional application No. 62/287,300, filed on Jan. 26, 2016.

(51) Int. Cl.
*F16L 55/027*   (2006.01)
*E03C 1/02*   (2006.01)
*F16L 35/00*   (2006.01)

(52) U.S. Cl.
CPC .............. *F16L 55/027* (2013.01); *E03C 1/02* (2013.01); *E03C 2001/028* (2013.01); *F16L 35/00* (2013.01)

(58) Field of Classification Search
CPC ............... F16L 27/0812; F16L 27/0824; F16L 27/0828; F16L 27/0832; F16L 55/027; F16L 35/00; E03C 1/02; E03C 2001/028
USPC ................................. 285/45, 80, 98, 272, 276
See application file for complete search history.

(56) References Cited

U.S. PATENT DOCUMENTS

| 2,676,039 | A | | 4/1954 | Habig |
| 3,997,198 | A | * | 12/1976 | Linder ................ F16L 27/0832 285/98 |
| 4,133,350 | A | | 1/1979 | Nelson |
| 4,366,973 | A | * | 1/1983 | Brekke ............... F16L 27/0828 285/276 |
| 4,669,760 | A | * | 6/1987 | Hashish .............. F16L 27/0832 285/272 |
| 4,811,976 | A | | 3/1989 | Yagisawa |
| 6,062,787 | A | | 5/2000 | Maddalena |
| 2003/0071141 | A1 | * | 4/2003 | Rieben ................ F16L 27/0824 |

* cited by examiner

*Primary Examiner* — Greg Binda
*Assistant Examiner* — Zachary T Dragicevich
(74) *Attorney, Agent, or Firm* — North Shore Patents, P.C.; Michele Liu Baillie

(57) ABSTRACT

A tamper-resistant frictionless connector assembly includes an outer sleeve with a first end and a second end opposite to the first end along an axis. A first sealed ring bearing has first outer ring, inner ring, and bearings, where the first outer ring is directly coupled to the outer sleeve at the first end. An inlet adapter directly coupled to the first inner ring and not directly coupled to the outer sleeve. A second sealed ring bearing has a second outer ring, inner ring, and bearings, where the second outer ring is directly coupled to the outer sleeve at a second end. An outlet adapter directly coupled to the second inner ring and not directly coupled to the outer sleeve. A thrust axial bearing abutting the inlet and outlet adapters, where the sealed ring bearings, the inlet adapter, and the outlet adapter are aligned along the axis.

6 Claims, 4 Drawing Sheets

TAMPER-RESISTANT FRICTIONLESS CONNECTOR ASSEMBLY

BACKGROUND OF THE INVENTION

Water and sewer costs and consumption have consistently increased over the years. Some of the water usage are through faucets and showers. Water saving devices, such as low flow showerheads and aerators, may be installed on the faucets and pipe stems to reduce the amount of water usage. However, such devices can be removed by the user. For example, an owner or manager of residential housing may install low flow showerheads in the residential units. However, the residents can remove the low flow showerheads and replace them with a showerhead that has a higher water consumption rating, thwarting the efforts by the owner or manager to control water usage and leading to higher operating costs. Similarly, the owner or manager may wish to prevent the removal and theft of the appliances installed on the faucets or pipe stems.

BRIEF SUMMARY OF THE INVENTION

Disclosed herein is a tamper-resistant frictionless connector assembly as specified in the independent claims. Embodiments of the present invention are given in the dependent claims. Embodiments of the present invention can be freely combined with each other if they are not mutually exclusive.

According to one embodiment of the present invention, a connector assembly includes: an outer sleeve comprising a first end and a second end, the second end of the outer sleeve being opposite to the first end of the outer sleeve along an axis; a first sealed ring bearing including a first outer ring, a first inner ring, and first bearings between the first inner and outer rings, the first outer ring being directly coupled to the outer sleeve at a first end of the outer sleeve; an inlet adapter directly coupled to the first inner ring of the first sealed ring bearing and not directly coupled to the outer sleeve; a second sealed ring bearing comprising a second outer ring, a second inner ring, and second bearings between the second inner and outer rings, the second outer ring being directly coupled to the outer sleeve at a second end of the outer sleeve; an outlet adapter directly coupled to the second inner ring of the second sealed ring bearing and not directly coupled to the outer sleeve; and a thrust axial bearing abutting the inlet adapter and the outlet adapter, wherein the first sealed ring bearing, the inlet adapter, the second sealed ring bearing, and the outlet adapter are aligned along the axis.

In one aspect of the present invention, the first outer ring of the first sealed ring bearing and the second outer ring of the second sealed ring bearing are clamped within the outer sleeve.

In another aspect of the present invention, the outer sleeve further includes a first raised section proximate to the first end and a second raised section proximate to the second end, and the first raised section includes a first surface facing away from the first end of the outer sleeve, where the first outer ring of the first sealed ring bearing abuts the first surface at a first side of the first sealed ring bearing. The second raised section includes a second surface facing away from the second end of the outer sleeve, where the second outer ring of the second sealed ring bearing abuts the second surface at a first side of the second sealed ring bearing.

In another aspect of the present invention, the first sealed ring bearing includes a first side and a second side, where the second side of the first sealed ring bearing is opposite to the first side of the first sealed ring bearing along the axis. The second sealed ring bearing includes a first side and a second side, where the second side of the second sealed ring bearing is opposite to the first side of the second sealed ring bearing along the axis. The first outer ring of the first sealed ring bearing is directly coupled to the outer sleeve at the first side of the first sealed ring bearing. The second outer ring of the second sealed ring bearing is directly coupled to the outer sleeve at the first side of the second sealed ring bearing. The inlet adapter includes a first ledge, where the first ledge abuts the first inner ring of the first sealed ring bearing at the second side of the first sealed ring bearing. The outlet adapter includes a second ledge, where the second ledge abuts the second inner ring of the second sealed ring bearing at the second side of the second sealed ring bearing.

In another aspect of the present invention, the inlet adapter further includes a first plurality of threads and the outlet adapter further includes a second plurality of threads. The first plurality of threads of the inlet adapter resides within an opening of the first sealed ring bearing, where the first plurality of threads of the inlet adapter is accessible at the first end of the outer sleeve. The second plurality of threads of the outlet adapter resides within an opening of the second sealed ring bearing, where the second plurality of threads of the outlet adapter is accessible at the second end of the outer sleeve.

In another aspect of the present invention, the inlet adapter includes a first indention and the outlet adapter includes a second indention. The thrust axial bearing resides within the first indention and the second indention.

In another aspect of the present invention, a rotational force applied on the outer sleeve along the axis causes the first outer ring of the first sealed ring bearing and the second outer ring of the second sealed ring bearing to rotate. The rotational force does not cause the first inner ring of the first sealed ring bearing to rotate, where the rotational force further does not cause the second inner ring of the second sealed ring bearing to rotate.

In another aspect of the present invention, the thrust axial bearing includes a first disk, a second disk, and bearings between the first disk and the second disk, where the first disk abuts the inlet adapter and the second disk abuts the outlet adapter. A force is applied to the adapter assembly along the axis causes the first and second disks of the thrust axial bearing to rotate, resulting in a rotation of the inlet adapter or the outlet adapter.

DETAILED DESCRIPTION OF THE INVENTION

The present invention provides a tamper-resistant frictionless connector assembly. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
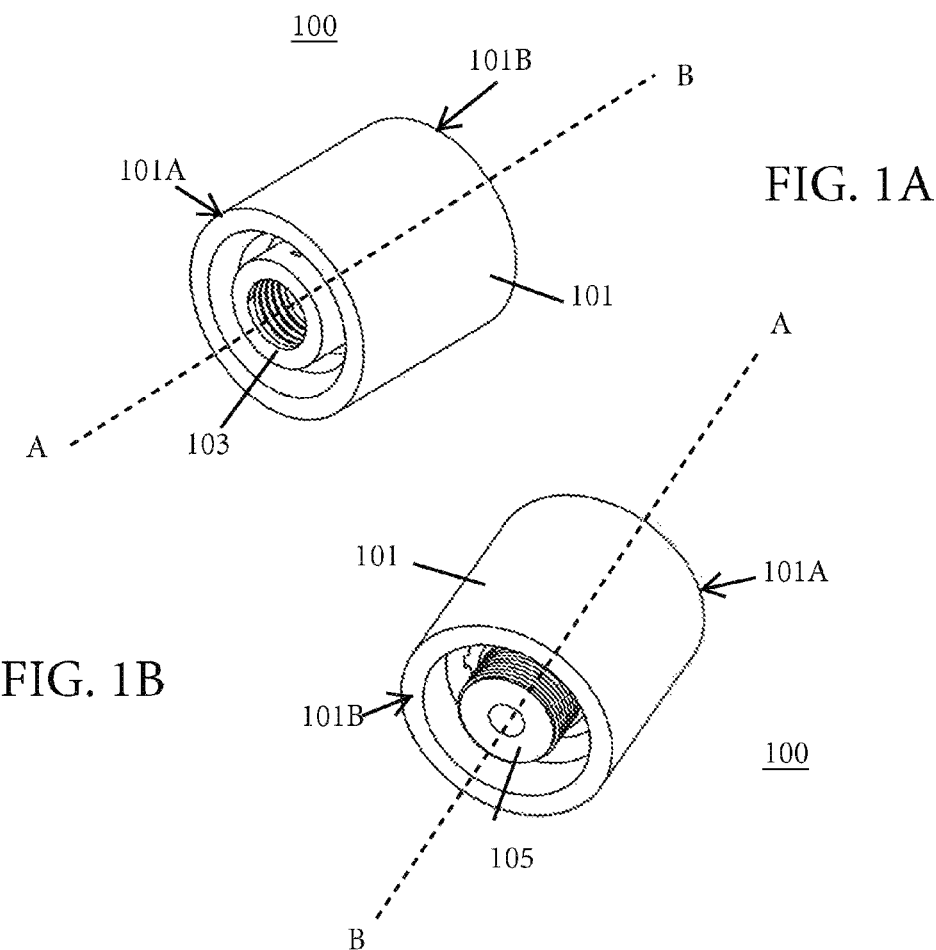
FIGS. 1A-1B illustrate an exemplary embodiment of an assembled tamper-resistant frictionless connector assembly according to the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, elements, and/or components, but do not preclude the presence or addition of one or more other features, elements, components, and/or groups thereof FIGS. 1A-1B illustrate an exemplary embodiment of an assembled tamper-resistant frictionless connector assembly according to the present invention. The connector assembly 100 comprises an outer sleeve 101. In this exemplary embodiment, the outer sleeve 101 has a cylindrical shape on its inside surface and along an axis A-B, as illustrated, and has a first end 101A and a second end 101B, with the second end 101B opposite to the first end 101A along the A-B axis. Within the outer sleeve 101 is an inlet adapter 103 that resides near the first end 101A and an outlet adapter 105 that resides near the second end 101B, as described further below. In this exemplary embodiment, the inlet adapter 103 and the outlet adapter 105 are also cylindrical in shape along the A-B axis.

Figure 2:
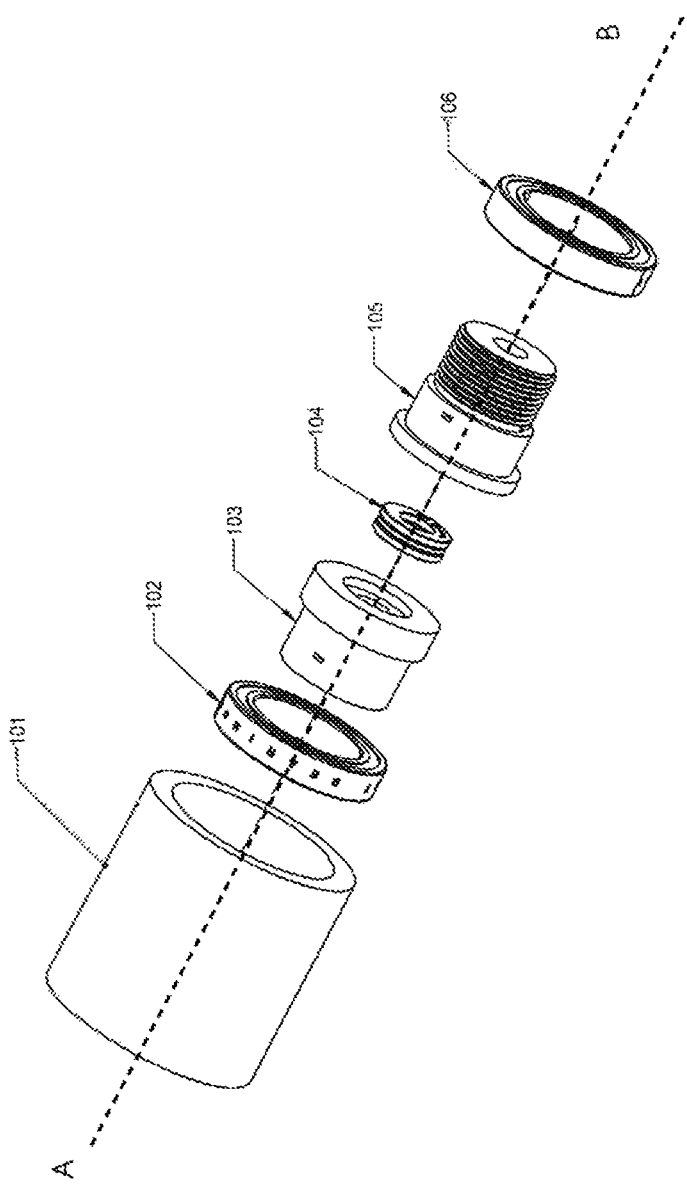
FIG. 2 illustrates an exploded view of the exemplary embodiment of the tamper-resistant frictionless connector assembly according to the present invention.

FIG. 2 illustrates an exploded view of the exemplary embodiment of the tamper-resistant frictionless connector assembly according to the present invention. Within the outer sleeve 101, the connector assembly 100 includes the inlet adapter 103 and the outlet adapter 105, a thrust axial bearing 104 abutting the inlet adapter 103 and the outlet adapter 105, a first sealed ring bearing 102 that abuts the inlet adapter 103 and the outer sleeve 101, and a second sealed ring bearing 106 that abuts the outlet adapter 105 and the outer sleeve 101. These illustrated components of the connector assembly 100 are aligned along the A-B axis.

Figure 3:
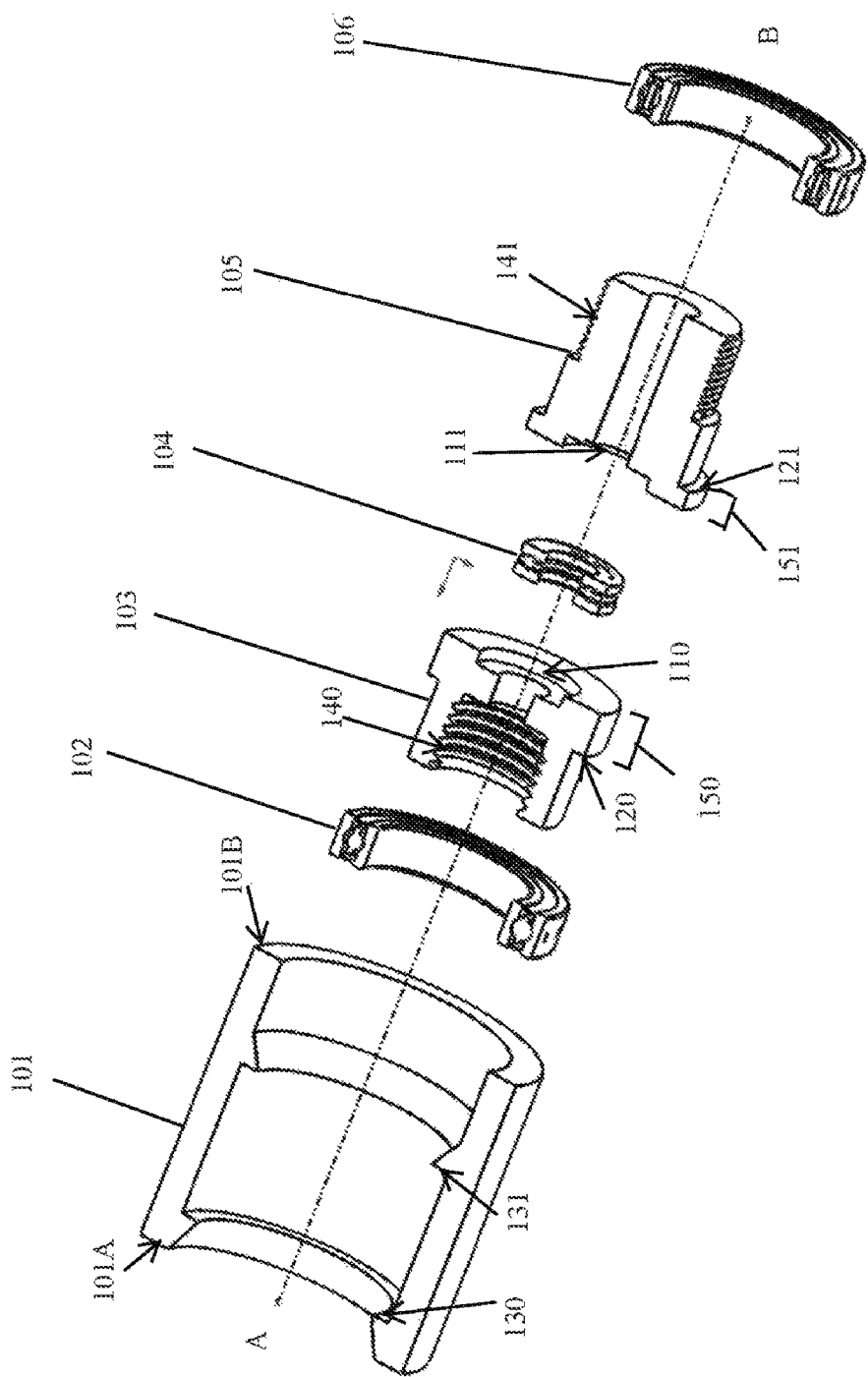
FIG. 3 illustrates a cross-sectional exploded view of the exemplary embodiment of the tamper-resistant frictionless connector assembly according to the present invention.

FIG. 3 illustrates a cross-sectional exploded view of the exemplary embodiment of the tamper-resistant frictionless connector assembly according to the present invention. The inlet adapter 103 comprises a first plurality of threads 140 capable of coupling to a pipe stem or faucet. The inlet adapter 103 further includes a first head section 150 with a first side and a second side, with the first side proximate to the first plurality of threads 140 and the second side being opposite to the first side along the A-B axis. At the first side of the first head section 150 is a first ledge 120, and at the second side of the first head section 150 is a first indentation 110. The outlet adapter 105 comprises a second plurality of threads 141 capable of coupling to a showerhead or other appliance. The outlet adapter 105 further includes a second head section 151 with a first side and a second side, with the first side proximate to the second plurality of threads 141 and the second side being opposite to the first side along the A-B axis. At the first side of the second head section 151 is a second ledge 121, and at the second side of the second head section 151 is a second indentation 111. The thrust axial bearing 104 is a rotary rolling-element bearing, which permits the rotation between parts and are designed to support a predominately axial load, i.e., a load exerted along the A-B axis. The first and second sealed ring bearings 102, 106 each include an outer ring and an inner ring, with bearings sealed between the outer and inner rings, as described further below. The bearings between the inner and outer rings allow the inner and outing rings to move independently. The first and second sealed ring bearings 102, 106 need not have identical configurations. The thrust axial bearing 104 comprises a first disk and a second disk, with bearings residing between the first and second disks, as described further below. The bearings allow the first and second disks to move independently. The outer sleeve 101 includes a first raised section 130 and a second raised section 131, as described further below.

Figure 4:
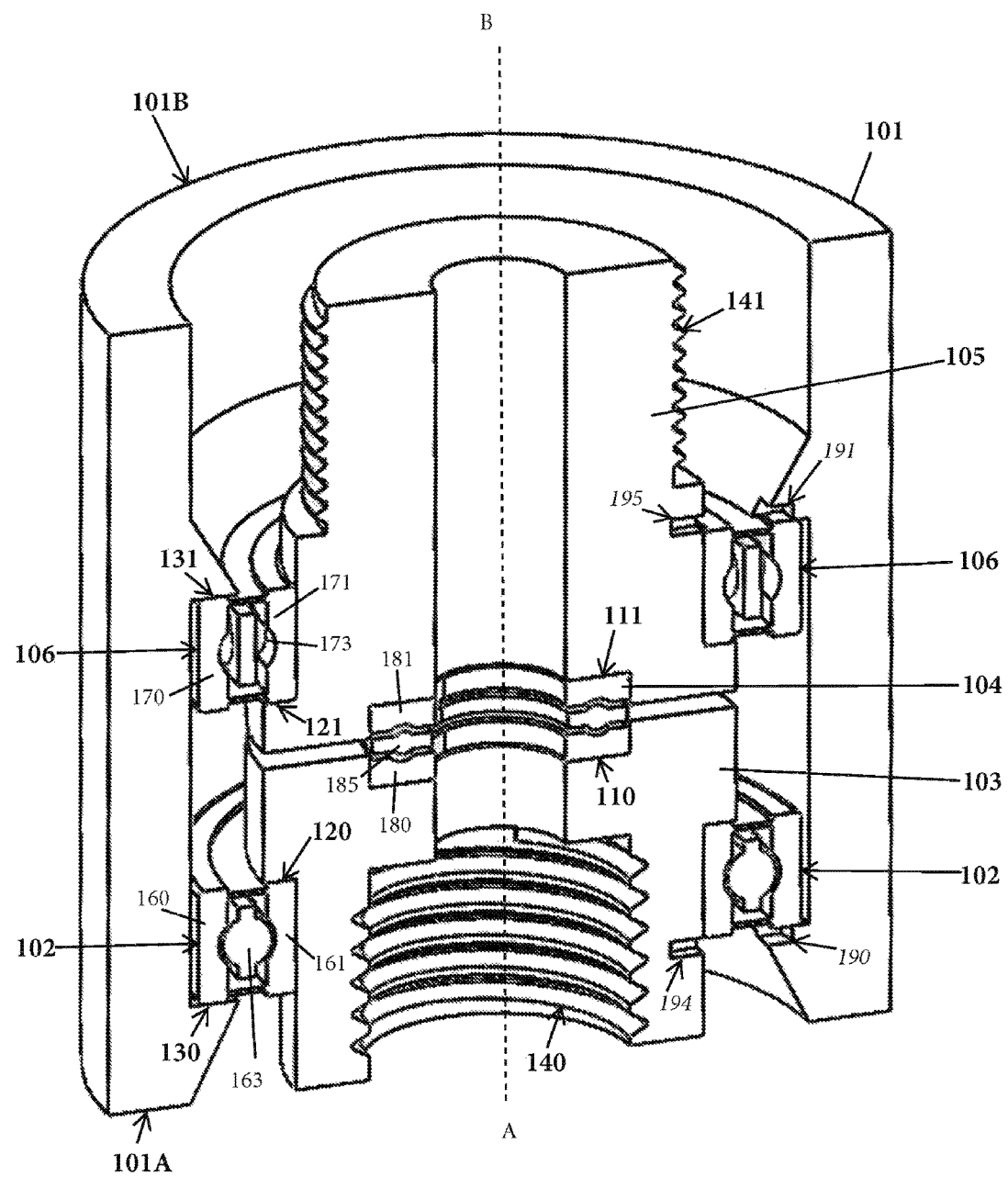
FIG. 4 illustrates an assembled cross-sectional view of the exemplary embodiment of the tamper-resistant frictionless connector assembly according to the present invention.

FIG. 4 illustrates an assembled cross-sectional view of the exemplary embodiment of the tamper-resistant frictionless connector assembly according to the present invention. Referring to both FIGS. 3 and 4, when assembled, a first outer ring 160 of the first sealed ring bearing 102 abuts the first raised section 130 of the outer sleeve 101 at a first side of the first sealed ring bearing 102. The first outer ring 160 of the first sealed ring bearing 102 directly abuts the outer sleeve 101. Here, the first raised section 130 includes a surface facing away from a first end 101A of the outer sleeve 101. The first outer ring 160 of the first sealed ring bearing 102 abuts this surface of the first raised section 130. The portion of the inlet adapter 103 comprising the first plurality of threads 140 reside within the center opening of the first sealed ring bearing 102, with the first plurality of threads 140 accessible from the first end 101A of the outer sleeve 101. The first inner ring 161 of the first sealed ring bearing 102 directly abuts the first ledge 120 of the inlet adapter 103 at a second side of the first sealed ring bearing 102. The second side of the first sealed ring bearing 102 is opposite to the first side of the first sealed ring bearing 102 along the A-B axis. First bearings 163 reside between the first inner and outer rings 160, 161 of the first sealed ring bearing 102.

Further, a second outer ring 170 of the second sealed ring bearing 106 abuts the second raised section 131 of the outer sleeve 101 at a first side of the second sealed ring bearing 106. The second outer ring 170 of the second sealed ring bearing 106 directly abuts the outer sleeve 101. Here, the second raised section 131 includes a surface facing away from a second end 101B of the outer sleeve 101. The second outer ring 170 of the second sealed ring bearing 106 abuts this surface of the second raised section 131. The portion of the outlet adapter 105 comprising the second plurality of threads 141 resides within the center opening of the second sealed ring bearing 106, with the second plurality of threads 141 accessible from the second end 101B of the outer sleeve 101. The second inner ring 171 of the second sealed ring bearing 106 directly abuts the second ledge 121 of the outlet adapter 105 at the second side of the second sealed ring bearing 106. The second side of the second sealed ring bearing 106 is opposite to the first side of the second sealed ring bearing 106 along the A-B axis. Optionally, rubber seals may be added to the first and second sealed ring bearings 102, 106 to provide a higher level of water-tightness, such as in high pressure systems. The thrust axial bearing 104 resides within the first indentation 110 of the inlet adapter 103 and the second indentation 111 of the outlet adapter 105, with the thrust axial bearing 104 abutting both the inlet adapter 103 and the outlet adapter 105. The thrust axial bearing 104 comprises a first disk 180 and a second disk 181, with bearings 185 residing between the first and second disks 180, 181. The first disk 180 resides in the first indention 110 and abuts the inlet adapter 103. The second disk 181 resides in the second indention 111 and abuts the outlet adapter 105.

When assembled, the first and second raised sections 130, 131 of the outer sleeve 101 compresses the first and second sealed ring bearings 102, 106, which in turn compresses the inlet and outlet adapters 103, 105. The outer sleeve 101 abuts the outer ring 160 of the first sealed ring bearing 102 and the outer ring 170 of the second sealed ring bearing 106. The inner ring 161 of the first sealed ring bearing 102 abuts the inlet adapter 103, and the inner ring 171 of the second sealed ring bearing 106 abuts the outlet adapter 105. Note that neither the inlet 103 nor the outlet 105 adapter directly abuts the outer sleeve 101. Thus, when a rotational force is applied to the outer sleeve 101 around the A-B axis, the outer rings 160, 170 of the first and second sealed ring bearings 102, 106 also rotate. However, since the inner rings 161, 171 of the first and second sealed ring bearings 102, 106 rotate independently from the outer rings 160, 170, the rotation of the outer sleeve 101 does not result in the rotation of the inlet or outlet adapters 103, 105. A rotational force on the outer sleeve 101 thus will not exert enough friction between the inlet or outlet adapters 103, 105 and any component coupled to the first or second plurality of threads 140, 141 to disengage the component from the inlet or outlet adapters 103, 105.

In addition, when force is applied to the connector assembly 100 along the A-B axis, the first and second disks 180, 181 of the thrust axial bearing 104 will rotate. Since the first and second disks 180, 181 rotate independently, the rotation of one disk does not result in the rotation of the other disk. Thus, when installed on a pipe stem, the load will cause the second disk 181 to rotate, resulting in the rotation of the outlet 105 adapter. However, the bearings 185 will prevent the first disk 180, and thus the inlet adapter 103, to rotate. A load exerted along the A-B axis thus will not exert enough friction between the outlet adapter 105 and any component coupled to the second plurality of threads 141 to disengage the component from the outlet adapter 105. The load also will not exert enough friction between the inlet adapter 103 and the pipe stem coupled to the first plurality of threads 140 to disengage the connector assembly 100 from the pipe stem. In this manner, a low flow showerhead coupled to the connector assembly 100 cannot be easily disengaged, nor can the connector assembly 100 be easily disengaged from the pipe. The connector assembly 100 of the present invention thus assists in preventing unwanted removal of water saving devices or other appliances coupled to the assembly 100. Although the thrust axial bearing 104 is described above with the first and second disks 180, 181 and bearings 185, a rotational axial bearing with other configurations and that respond to a load applied along the A-B axis in a similar manner can also be used.

Optionally, the outer sleeve 101 may include indentions 190, 191, with corresponding indentions 194, 195 in the inlet 103 and outlet 105 adapters, respectively. The locations of the indentions 190, 191 on the outer sleeve 101 may optionally be placed elsewhere on the outer sleeve 101, with the indentions 194, 195 placed in corresponding locations in the inlet 103 and outlet 105 adapters. A "key" (not shown) may be used to bridge the gap between the indention 190 on the outer sleeve 101 and the indention 194 on the inlet adapter 103 to cause the inlet adapter 103 to be directly coupled to the outer sleeve 101. In this configuration, when the outer sleeve 101 is rotated around the A-B axis, friction will be applied to the inlet adapter 103, causing the inlet adapter 103 to rotate. The connector assembly 100 may then be disengaged from any component coupled to the first set of threads 140. Similarly, a key may be used to bridge the gap between the indention 191 on the outer sleeve 101 and the indention 195 on the outlet adapter 105 to cause the outlet adapter 105 to be directly coupled to the outer sleeve 101. In this configuration, when the outer sleeve 101 is rotated around the A-B axis, friction will be applied to the outlet adapter 105, causing the outlet adapter 105 to rotate. Any component coupled to the second set of threads 141 may then be disengaged from the outlet adapter 105.

Although the exemplary embodiments are described with the use of the raised sections 130, 131 to compress the other described components, other compression techniques may be used without departing from the spirit and scope of the present invention.

Although the inlet 103 and outlet 105 adapters are described above with the plurality of threads 140, 141, respectively, other mechanisms for coupling appliances to the inlet 103 or outlet 105 adapters may also be used without departing from the spirit and scope of the present invention.

Although the exemplary embodiments are described in the context of showerheads and faucets, the connector assembly 100 may also be in other contexts and are not intended to be limited to the uses described herein.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A connector assembly, comprising:
   an outer sleeve comprising a first end and a second end, the second end of the outer sleeve being opposite to the first end of the outer sleeve along an axis;
   a first sealed ring bearing comprising a first outer ring, a first inner ring, and first bearings between the first inner and outer rings, the first outer ring being directly coupled to the outer sleeve at the first end of the outer sleeve;
   an inlet adapter directly coupled to the first inner ring of the first sealed ring bearing and not directly coupled to the outer sleeve;
   a second sealed ring bearing comprising a second outer ring, a second inner ring, and second bearings between the second inner and outer rings, the second outer ring being directly coupled to the outer sleeve at the second end of the outer sleeve;
   an outlet adapter directly coupled to the second inner ring of the second sealed ring bearing and not directly coupled to the outer sleeve; and a thrust axial bearing abutting the inlet adapter and the outlet adapter, wherein the first sealed ring bearing, the inlet adapter, the second sealed ring bearing, and the outlet adapter are aligned along the axis, wherein the first outer ring of the first sealed ring bearing and the second outer ring of the second sealed ring bearing are clamped within the outer sleeve, wherein the outer sleeve further comprises a first raised section proximate to the first end and a second raised section proximate to the second end, wherein the first raised section comprises a first surface facing away from the first end of the outer sleeve, wherein the first outer ring of the first sealed ring bearing abuts the first surface at a first side of the first sealed ring bearing, wherein the second raised section comprises a second surface facing away from the second end of the outer sleeve, wherein the second outer ring of the second sealed ring bearing abuts the second surface at a first side of the second sealed ring bearing.

2. A connector assembly, comprising:

an outer sleeve comprising a first end and a second end, the second end of the outer sleeve being opposite to the first end of the outer sleeve along an axis;

a first sealed ring bearing comprising a first outer ring, a first inner ring, and first bearings between the first inner and outer rings, the first outer ring being directly coupled to the outer sleeve at the first end of the outer sleeve;

an inlet adapter directly coupled to the first inner ring of the first sealed ring bearing and not directly coupled to the outer sleeve;

a second sealed ring bearing comprising a second outer ring, a second inner ring, and second bearings between the second inner and outer rings, the second outer ring being directly coupled to the outer sleeve at the second end of the outer sleeve;

an outlet adapter directly coupled to the second inner ring of the second sealed ring bearing and not directly coupled to the outer sleeve; and a thrust axial bearing abutting the inlet adapter and the outlet adapter, wherein the first sealed ring bearing, the inlet adapter, the second sealed ring bearing, and the outlet adapter are aligned along the axis, wherein the first sealed ring bearing comprises a first side and a second side, wherein the second side of the first sealed ring bearing is opposite to the first side of the first sealed ring bearing along the axis, wherein the second sealed ring bearing comprises a first side and a second side, wherein the second side of the second sealed ring bearing is opposite to the first side of the second sealed ring bearing along the axis, wherein the first outer ring of the first sealed ring bearing is directly coupled to the outer sleeve at the first side of the first sealed ring bearing, wherein the second outer ring of the second sealed ring bearing is directly coupled to the outer sleeve at the first side of the second sealed ring bearing, wherein the inlet adapter comprises a first ledge, wherein the first ledge abuts the first inner ring of the first sealed ring bearing at the second side of the first sealed ring bearing, wherein the outlet adapter comprises a second ledge, wherein the second ledge abuts the second inner ring of the second sealed ring bearing at the second side of the second sealed ring bearing.

3. The connector assembly of claim 2, wherein the inlet adapter further comprises a first plurality of threads and the outlet adapter further comprises a second plurality of threads, wherein the first plurality of threads of the inlet adapter resides within an opening of the first sealed ring bearing, wherein the first plurality of threads of the inlet adapter is accessible at the first end of the outer sleeve, wherein the second plurality of threads of the outlet adapter resides within an opening of the second sealed ring bearing, wherein the second plurality of threads of the outlet adapter is accessible at the second end of the outer sleeve.

4. A connector assembly, comprising:

an outer sleeve comprising a first end and a second end, the second end of the outer sleeve being opposite to the first end of the outer sleeve along an axis;

a first sealed ring bearing comprising a first outer ring, a first inner ring, and first bearings between the first inner and outer rings, the first outer ring being directly coupled to the outer sleeve at the first end of the outer sleeve;

an inlet adapter directly coupled to the first inner ring of the first sealed ring bearing and not directly coupled to the outer sleeve;

a second sealed ring bearing comprising a second outer ring, a second inner ring, and second bearings between the second inner and outer rings, the second outer ring being directly coupled to the outer sleeve at the second end of the outer sleeve;

an outlet adapter directly coupled to the second inner ring of the second sealed ring bearing and not directly coupled to the outer sleeve; and a thrust axial bearing abutting the inlet adapter and the outlet adapter, wherein the first sealed ring bearing, the inlet adapter, the second sealed ring bearing, and the outlet adapter are aligned along the axis, wherein a rotational force applied on the outer sleeve along the axis causes the first outer ring of the first sealed ring bearing and the second outer ring of the second sealed ring bearing to rotate, wherein the rotational force does not cause the first inner ring of the first sealed ring bearing to rotate, wherein the rotational force further does not cause the second inner ring of the second sealed ring bearing to rotate.

5. A connector assembly, comprising:

an outer sleeve comprising a first end and a second end, the second end of the outer sleeve being opposite to the first end of the outer sleeve along an axis;

a first sealed ring bearing comprising a first outer ring, a first inner ring, and first bearings between the first inner and outer rings, the first outer ring being directly coupled to the outer sleeve at the first end of the outer sleeve;

an inlet adapter directly coupled to the first inner ring of the first sealed ring bearing and not directly coupled to the outer sleeve;

a second sealed ring bearing comprising a second outer ring, a second inner ring, and second bearings between the second inner and outer rings, the second outer ring being directly coupled to the outer sleeve at the second end of the outer sleeve;

an outlet adapter directly coupled to the second inner ring of the second sealed ring bearing and not directly coupled to the outer sleeve; and a thrust axial bearing abutting the inlet adapter and the outlet adapter, wherein the first sealed ring bearing, the inlet adapter, the second sealed ring bearing, and the outlet adapter are aligned along the axis, wherein the thrust axial bearing comprises a first disk, a second disk, and bearings between the first disk and the second disk, wherein the first disk abuts the inlet adapter and the second disk abuts the outlet adapter, wherein a force is applied to the adapter assembly along the axis causes the second disk of the thrust axial bearing to rotate but does not cause the first disk to rotate, resulting in a rotation of the outlet adapter and no rotation of the inlet adapter.

6. The connector assembly of claim 5, wherein the inlet adapter comprises a first indention and the outlet adapter comprises a second indention, wherein the thrust axial bearing resides within the first indention and the second indention.

\* \* \* \* \*